(12) United States Patent
Nakamura et al.

(10) Patent No.: US 8,146,330 B2
(45) Date of Patent: Apr. 3, 2012

(54) HEAT-SEALING DEVICE FOR SHEET PACKAGES

(76) Inventors: Kenji Nakamura, Osaka (JP); Koji Nakamura, Osaka (JP)

( * ) Notice: Subject to any disclaimer, the term of this patent is extended or adjusted under 35 U.S.C. 154(b) by 399 days.

(21) Appl. No.: 12/604,804

(22) Filed: Oct. 23, 2009

(65) Prior Publication Data

US 2010/0101184 A1    Apr. 29, 2010

(30) Foreign Application Priority Data

Oct. 24, 2008   (JP) ................................ 2008-274037

(51) Int. Cl.
*B65B 7/02* (2006.01)

(52) U.S. Cl. .............................. 53/477; 53/410; 53/133.3

(58) Field of Classification Search ..................... 53/477, 53/479, 329.2, 410, 412, 133.3, 133.4; 493/102, 493/129, 141, 212, 214
See application file for complete search history.

(56) References Cited

U.S. PATENT DOCUMENTS

| | | | | |
|---|---|---|---|---|
| 4,185,754 A | * | 1/1980 | Julius | 221/63 |
| 5,161,350 A | * | 11/1992 | Nakamura | 53/412 |
| 5,582,294 A | * | 12/1996 | Yamada | 206/494 |
| 5,729,955 A | | 3/1998 | Yamada | |
| 6,026,953 A | * | 2/2000 | Nakamura et al. | 206/233 |
| 6,702,109 B1 | * | 3/2004 | Tabuchi | 206/233 |
| 6,996,949 B1 | * | 2/2006 | Bergerioux et al. | 53/412 |
| 7,025,220 B2 | * | 4/2006 | Verespej et al. | 220/259.1 |
| 7,841,156 B2 | * | 11/2010 | Naroska et al. | 53/478 |
| 2003/0159403 A1 | * | 8/2003 | Verespej et al. | 53/412 |

* cited by examiner

*Primary Examiner* — Hemant M Desai

(74) *Attorney, Agent, or Firm* — Knobbe Martens Olson & Bear LLP

(57) ABSTRACT

A heat-sealing device for sheet packages includes: a pressure heat-sealing part that presses and heat seals a lid unit component placed on a moving bag-forming film; a heat-sealing mechanism having a frame body to support the pressure heat-sealing part; a drive mechanism having a linear motor that serves as a drive source to move the heat-sealing mechanism back and forth; and a link mechanism that links the two mechanisms, wherein the heat-sealing mechanism includes double heat-sealing mechanisms having two units of the heat-sealing mechanism installed side by side in parallel at positions vertical to the moving direction of the bag-forming film.

19 Claims, 5 Drawing Sheets

[Figure 1]
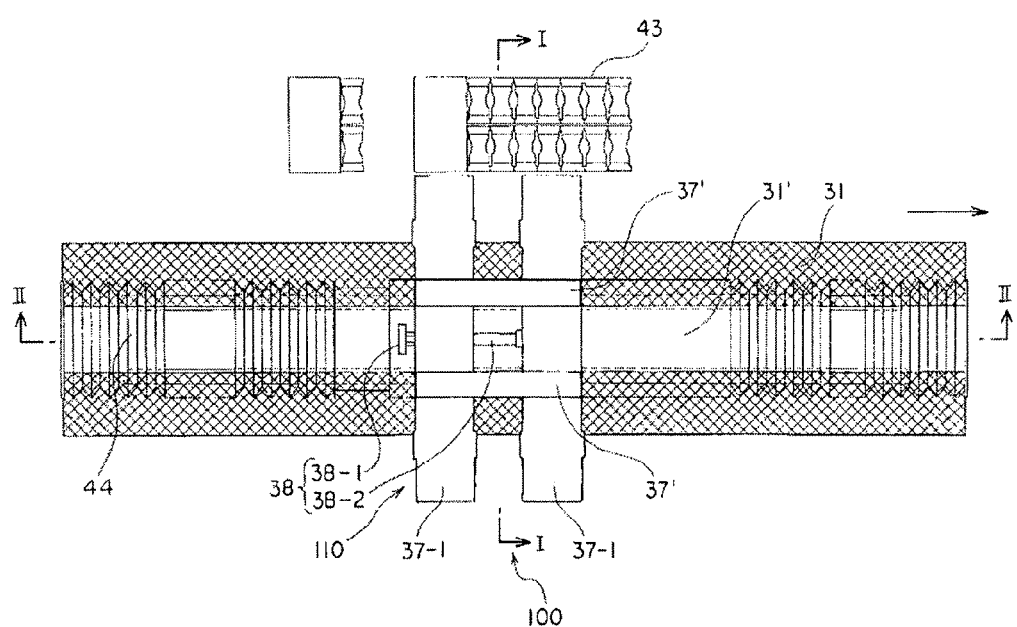

[Figure 2]
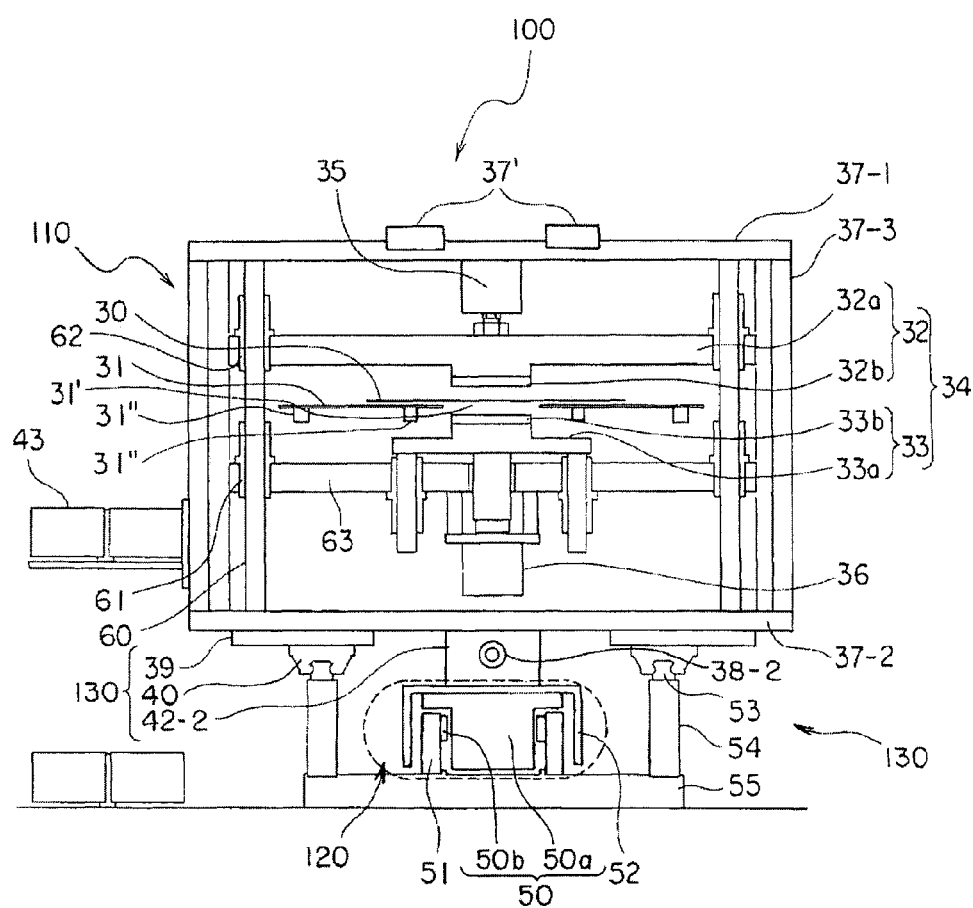

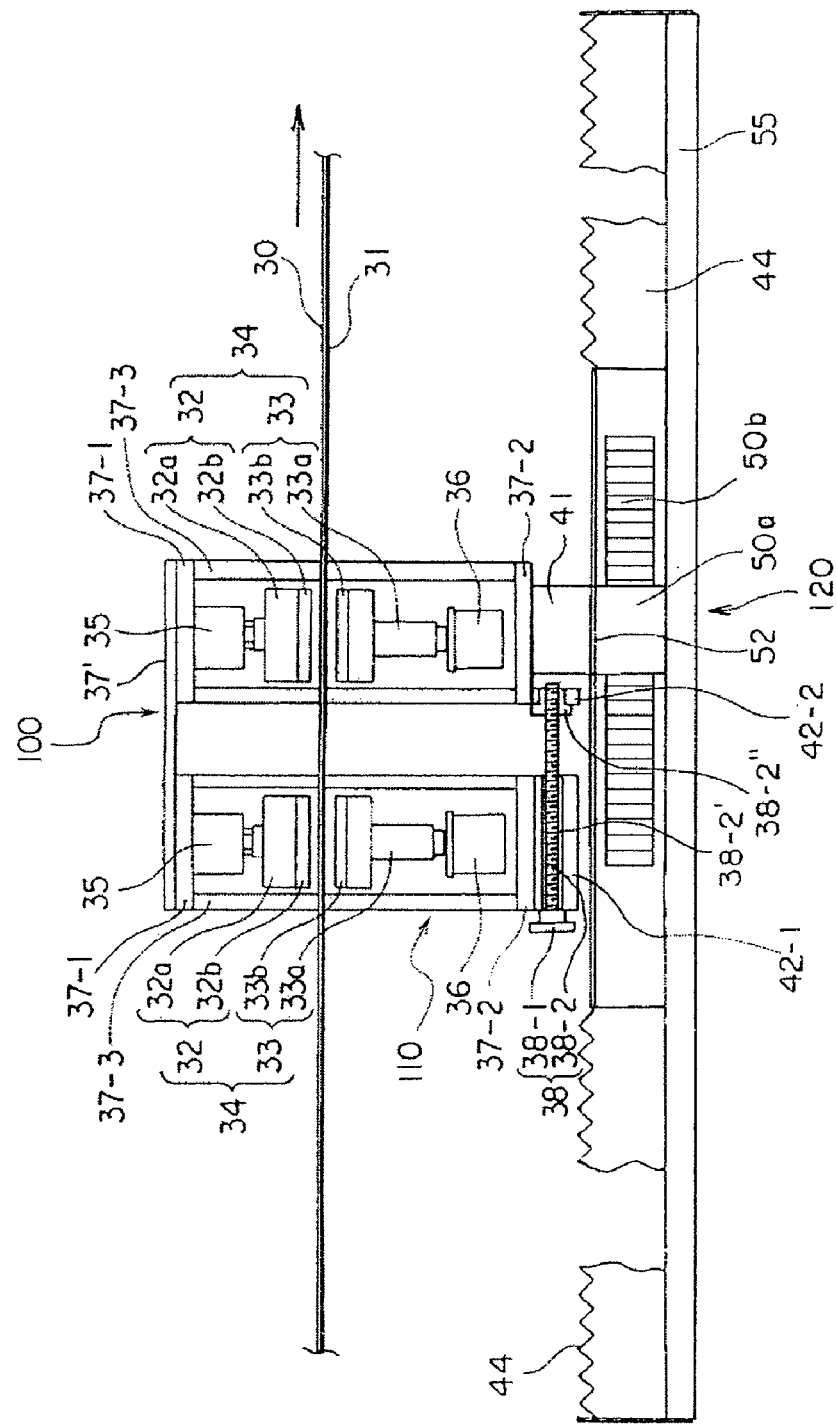
[Figure 3]

[Figure 4]
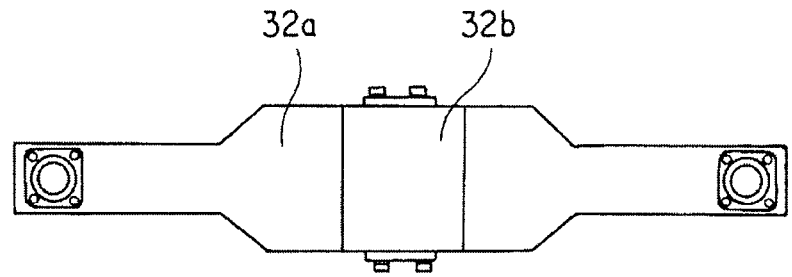
[Figure 5]
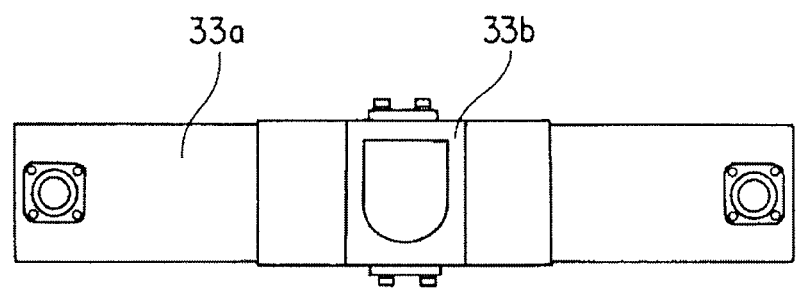
[Figure 6]
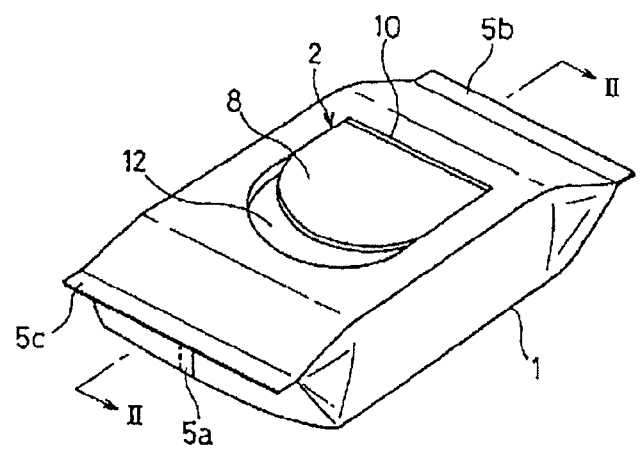

[Figure 7]
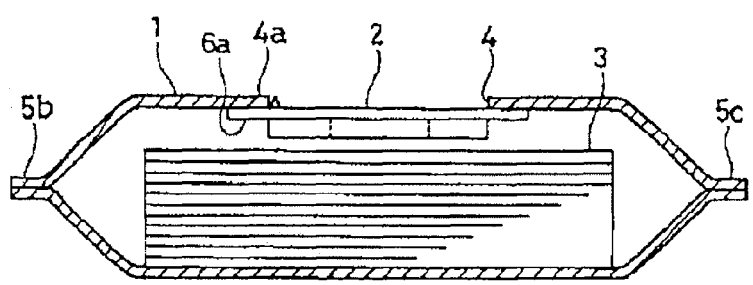
[Figure 8]
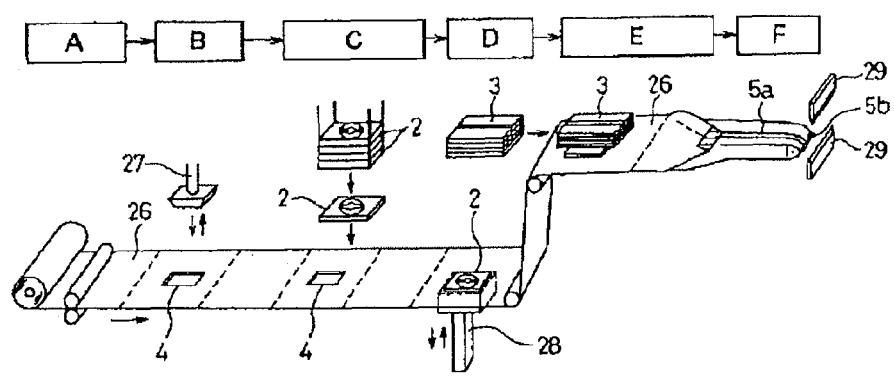

HEAT-SEALING DEVICE FOR SHEET PACKAGES

BACKGROUND OF THE INVENTION

1. Field of the Invention

The present invention relates to a heat-sealing device for sheet packages that presses and seals onto a bag-forming film a lid unit component that allows sheets stored in the bag to be taken out.

2. Description of Related Art

Conventionally, a wet-tissue package has been known as an example of a package of sheets where wet tissues are stored in the package in a manner retrievable one by one from the take-out opening (refer to Patent Literature 1). The wet-tissue package has a structure shown in FIGS. 6 and 7, where FIG. 6 is an oblique view of the wet-tissue package, while FIG. 7 is a longitudinal section view of the wet-tissue package in FIG. 6 cut along the II-II line.

The structure of the wet-tissue package is explained by referring to FIGS. 6 and 7.

Symbol 1 indicates a bag, while 2 indicates a lid unit component, where a wet-tissue stack 3 is stored inside the bag 1 having this lid unit component 2, as shown in FIG. 7.

The bag 1 can be made of any material which is air-tight, such as polyethylene, polypropylene, polyester, polyamide or any other plastic film capable of preventing the chemical agent, cosmetic or any other substance impregnated in the wet tissues from oozing out or volatilizing.

The lid unit component 2 is installed on the top bag surface in a manner covering the opening 4 provided in the top surface of the bag 1, wherein a contact part where the top surface along the periphery 6a of the substrate of the component 2 contacts the bottom surface of the circumference 4a of the opening 4 is connected by a joining method such as heat sealing to securely adhere the component 2 onto the top surface of the body 1 in a manner covering the opening 4.

FIG. 8 is a schematic drawing showing a process of manufacturing wet-tissue packages by joining, via heat sealing, a bag-forming film 26 with a lid unit component 2 into one piece and then packaging wet tissues inside.

As one example of the manufacturing process for wet-tissue packages, a process where wet-tissue packages are obtained through steps A to F, as shown in FIG. 8, is known (refer to FIG. 13 of Patent Literature 1). According to this manufacturing process, a bag-forming film 26 constituted by an air-tight film material is continuously fed from a feeding device in step A in such a way that the inner side of the bag faces out, and then in step B a hole of an appropriate size is punched out in the film using a stamping device 27 to form an opening 4, after which a lid unit component 2 is fed in step C with the component 2 placed over the formed surface of the opening in the film and temporarily attached there, and finally in step D the heat-sealing device 28 is applied from the back of the film 26 and the heating plate of the heat-sealing device 28 is pressed onto the circumference of the opening 4 to join the film 26 and lid unit component 2 into one piece by heat sealing.

Wet-tissue packages are obtained by:

folding wet tissues constituted by sheet materials made of paper, etc., that have been impregnated with a chemical agent, etc., stacking them into multiple layers in such a way that the ends of adjacent tissues are overlapping one another, and feeding the resulting wet-tissue stack 3 to be placed on top of the formed lid unit component surface of the film 26, in step E;

wrapping the wet-tissue stack 3 with the film 26 using a bagging device, joining the overlapping part 5a of the film 26 at the center by a joining method such as heat sealing, while also joining the overlapping parts 5b, 5c formed at both ends of the overlapping part 5a at the center in the same manner by a joining method such as heat sealing, to form a bag, in step F; and further using a heated blade 29 to cut along the boundary between adjacent bags that have been manufactured consecutively in the manner, to separate the bags.

As shown in FIG. 8, the heat-sealing device 28 used in step D mentioned above is applied from the back of the film 26 in such a way that the heating plate of the heat-sealing device 28 is pressed against the circumference of the opening 4 to join the film 26 and lid unit component 2 into one piece by heating, etc. This conventional heat-sealing device 28 uses a rotary motor as a drive source to produce back-and-forth motion, where generally a ball screw mechanism is used for this conversion of rotary motion into back-and-forth motion. Although not illustrated, a pressing device that presses against and sandwiches the film 26 on the heat-sealing device 28 is provided above, and when a lid unit component 2 placed on a film 26 arrives the pressing device comes down and simultaneously the heat-sealing device 28 moves up to sandwich the film 26 and lid unit component 2, and in this condition the lid unit component 2 is thermally set onto the film 26 and the two become one piece in approx. 2 seconds, after which the pressing device moves up and simultaneously the heat-sealing device 28 comes down until both the pressing device and heat-sealing device 28 return to their original positions, and the operations are performed repeatedly. In one minute, the device is able to join a bag-forming film with approx. 20 lid unit components placed on top of the film.

It should also be noted that the needs for sheet packages of various types, sizes and other characteristics are increasing, but no heat-sealing device is known that can manufacture sheet packages according to these needs for various types and sizes.

[Patent Literature 1] U.S. Pat. No. 5,729,955, Specification

SUMMARY

The heat-sealing device 28 used to make wet-tissue packages, as described in Patent Literature 1, has poor productivity in that it can only join approx. 20 lid unit components per minute, and this device is also subject to the problem of lower accuracy due to a worn ball screw because a ball screw is used as a mechanism to convert rotary motion into back-and-forth motion. In addition, there is a need for a heat-sealing device that can produce sheet packages of all types and sizes in an efficient manner.

In light of the above, the present invention aims to provide a heat-sealing device that can produce sheet packages of all types and sizes in an efficient manner without a decrease in accuracy.

To achieve the aim, a heat-sealing device for sheet packages based on the invention pertaining to Embodiment 1 is a heat-sealing device for sheet packages that presses and heat seals a lid unit component onto a bag-forming film, wherein said heat-sealing device for sheet packages is characterized in that it is equipped with:

a pressure heat-sealing part that presses and heat seals a lid unit component placed on a moving bag-forming film;

a heat-sealing mechanism having a frame body to support the pressure heat-sealing part;

a drive mechanism having a linear motor that serves as a drive source to move the heat-sealing mechanism back and forth; and
a link mechanism that links the above two mechanisms;
wherein the heat-sealing mechanism comprises double heat-sealing mechanisms having two units of the heat-sealing mechanism installed side by side in parallel at positions vertical to the moving direction of the bag-forming film;
wherein the linear motor of the drive mechanism comprises multiple pairs of stators and a mover provided between each pair; and
wherein the link mechanism comprises:
the frame body of the front heat-sealing mechanism as viewed in the moving direction of the bag-forming film;
a connection member that connects the mover of the drive mechanism;
a rail that supports the double heat-sealing mechanisms in a slidable manner; and
a rail slide member.

Similarly, a heat-sealing device for sheet packages based on the invention pertaining to Embodiment 2 is characterized in that the pressure heat-sealing part comprises:
a pressure part that presses the lid unit component; and
a heat-sealing part that heats the bag-forming film and joins it as into one piece with the lid unit component;
while the frame body comprises:
a top plate;
a bottom plate; and
a support.

A heat-sealing device for sheet packages based on the invention pertaining to Embodiment 3 is characterized in that the pressure part is installed on the cylinder rod of a hydraulic actuator for pressing while the heat-sealing part is installed on the cylinder rod of a hydraulic actuator for heat-sealing, and the top plate and bottom plate are rectangular.

A heat-sealing device for sheet packages based on the invention pertaining to Embodiment 4 is characterized in that the heat-sealing part comprises:
a heat-sealing member; and
a heat-sealing plate.

A heat-sealing device for sheet packages based on the invention pertaining to Embodiment 5 is characterized in that the heat-sealing plate of the heat-sealing part is replaceable.

A heat-sealing device for sheet packages based on the invention pertaining to Embodiment 6 is characterized in that the connection member is affixed at the center of the bottom plate constituting the frame body of the front heat-sealing mechanism, where the mover is connected to the bottom end of the connection member.

A heat-sealing device for sheet packages based on the invention pertaining to Embodiment 7 is characterized in that the rail is installed on rail bases provided at the left end and right end of the base of said heat-sealing device for sheet packages, where the rail slide member has a rail groove that engages with the rail.

A heat-sealing device for sheet packages based on the invention pertaining to Embodiment 8 is characterized in that an interval adjustment member that adjusts the interval between the double heat-sealing mechanisms, is installed on a mounting member mounted at the center of the left end of the bottom plate constituting the frame body of the front heat-sealing mechanism and also on a mounting member mounted at the center of the bottom plate constituting the frame body of the rear heat-sealing mechanism.

A heat-sealing device for sheet packages based on the invention pertaining to Embodiment 9 is characterized in that the interval adjustment member comprises a ball screw with operation handle.

A heat-sealing device for sheet packages based on the invention pertaining to Embodiment 10 is characterized in that the operation handle of the ball screw with operation handle is installed on a mounting member mounted at the center of the rear row's bottom plate, while the screw of the ball screw with operation handle is installed on a mounting member mounted at the center of the left end of the front row's bottom plate.

A heat-sealing device for sheet packages based on the invention pertaining to Embodiment 11 is characterized in that the mounting members of the rear row and front row are installed in a manner suspended respectively from the bottom plates.

A heat-sealing device for sheet packages based on the invention pertaining to Embodiment 12 is characterized in that the interval between the double heat-sealing mechanisms can be adjusted by operating the operation handle.

A heat-sealing device for sheet packages based on the invention pertaining to Embodiment 13 is characterized in that the stators of the drive mechanism are installed at equal intervals on the inner walls of the stator-affixing members provided at the center of the base of said heat-sealing device for sheet packages, wherein the stator-affixing members are erected on the base and sandwiching the mover.

A heat-sealing device for sheet packages based on the invention pertaining to Embodiment 14 is characterized in that the mover of the drive mechanism is connected between the pair of stators, wherein the mover is suspended from the connection member.

A heat-sealing device for sheet packages based on the invention pertaining to Embodiment 15 is characterized in that the mover has a cover with an upside-down "U" cross-section affixed on top, and the cover is installed in a manner covering the mover and stator-affixing members.

A heat-sealing device for sheet packages based on the invention pertaining to Embodiment 16 is characterized in that the double heat-sealing mechanisms move back and forth via the connection member that links to the mover of the linear motor, in accordance with the back-and-forth movement of the mover.

A heat-sealing device for sheet packages based on the invention pertaining to Embodiment 17 is characterized in that the rail slide member of the link mechanism moves back and forth while sliding on the rail of the link mechanism.

A heat-sealing device for sheet packages based on the invention pertaining to Embodiment 18 is characterized in that the bag-forming film travels on the film transfer panel having a space at the center.

A heat-sealing device for sheet packages based on the invention pertaining to Embodiment 19 is characterized in that the film transfer panel is made of knurled stainless steel.

A heat-sealing device for sheet packages conforming to the present invention, which uses double heat-sealing mechanisms as well as a linear motor as a drive source, and which can increase the production efficiency to at least 2.5 times the efficiency of a conventional heat-sealing device, and its accuracy does not decrease even after a long period of continuous operation.

Also, this heat-sealing device for sheet packages has interval adjustment members for adjusting the intervals between the double heat-sealing mechanisms, and also uses a replaceable heat-sealing plate, and therefore it allows for interval adjustment for the double heat-sealing mechanisms as well as use of any heat-sealing plate appropriate for the type and size of the desired sheet package. As a result, production can be adjusted to any sheet packages whose type and size is becoming increasingly diverse.

BRIEF DESCRIPTION OF THE DRAWINGS

FIG. 1 is a plan view of a heat-sealing device for sheet packages.

FIG. 2 is a longitudinal section view showing a section of the drive mechanism and heat-sealing mechanism in FIG. 1 cut along the line I-I line.

FIG. 3 is a longitudinal section view showing a section of the drive mechanism, heat-sealing mechanism and interval adjustment member in FIG. 1 cut along the line II-II line.

FIG. 4 is a plan view of the pressure member and pressure plate of the pressure part as seen from below.

FIG. 5 is a plan view of the heat-sealing member and heat-sealing plate of the heat-sealing part as seen from above.

FIG. 6 is an oblique view of a wet-tissue package.

FIG. 7 is a longitudinal section view showing the package in FIG. 6 cut along the II-II line.

FIG. 8 is a schematic drawing showing a process of manufacturing wet-tissue packages by packaging wet tissues.

DETAILED DESCRIPTION

One of the best modes for carrying out the present invention is explained according to the attached drawings. Take note that the heat-sealing device for sheet packages proposed by the present invention (hereinafter referred to as "heat-sealing device for packages") is used in step D of the process shown in FIG. 8 explained above, where wet-tissue packages manufactured through the respective steps is the same as those described in Patent Literature 1. Accordingly, the names of members and other items relating to wet-tissue packages conform to the names of their corresponding counterparts in FIG. 8 or Patent Literature 1. It should be noted, however, that the present invention is not at all limited to wet-tissue packages, but it covers all types of sheets instead, and wet-tissue packages are used only as one illustration of sheet packages.

FIG. 1 is a plan view of a heat-sealing device for packages 100.

Symbol 31 indicates a film transfer panel, where this film transfer panel 31, indicated by a hatched pattern in FIG. 1, is made of stainless steel that has been knurled into an oval or spindle shape with its center raised in a convex shape toward the traveling direction of the film. The panel is affixed via a base, and a bag-forming film 30 (not illustrated) moves on the panel as it is reeled in with lid unit components placed on top. Even when the bag-forming film 30 moves on the transfer panel 31, the film transfer panel 31 made of knurled stainless steel does not generate electrostatic charges due to frictional resistance, which allows for smooth movement of the film.

Symbol 110 indicates a heat-sealing mechanism, where this heat-sealing mechanism 110 comprises:
a pressure heat-sealing part 34 that presses a lid unit component 2 (not illustrated) placed on the bag-forming film; and
a frame body 37 that supports the pressure heat-sealing part (refer to FIG. 2).

The heat-sealing mechanism 110 has double heat-sealing mechanisms 110, 110 installed side by side in parallel at positions vertical to the moving direction shown by the arrow of the bag-forming film 30, where a pair of rectangular members 37' are affixed onto the top surface of the top plate 37-1 of the heat-sealing mechanism 110 in the front row as viewed in the moving direction (hereinafter referred to as "front heat-sealing mechanism"), while being installed in a slidable manner on the top plate 37-1 of the heat-sealing mechanism 110 in the rear row as viewed in the moving direction (hereinafter referred to as "rear heat-sealing mechanism"), and accordingly the rear heat-sealing mechanism 110 can move.

A space 31' is formed at the center of the film transfer panel 31 and the bag-forming film 30 that moves on this panel has lid unit components 2 placed on top at equal intervals, and as the film moves in the direction of the arrow to appropriate positions of the double heat-sealing mechanisms 110, 110 the bag-forming film 30 and lid unit component 2 are pressed against each other by the pressure heat-sealing part 34 (refer to FIG. 3) and joined into one piece by heating, etc.

Symbol 38 indicates an interval adjustment member that moves the rear heat-sealing mechanism 110 forward and backward with respect to the front heat-sealing mechanism 110 to adjust the interval between the two, while symbol 38-2 indicates a ball screw and symbol 38-1, an operation handle of this ball screw. The interval adjustment member 38 will be explained in detail when FIG. 3 is explained.

Symbol 43 is a cable storage part that stores the various cables interlinking the heat-sealing mechanism 110, drive mechanism 120 and control unit (not illustrated), where this storage part prevents the cables from tangling up or breaking.

FIG. 2 is a longitudinal section view showing a section of the device shown in FIG. 1 cut along the I-I line, where a longitudinal section of the heat-sealing mechanism 110, drive mechanism 120 and link mechanism 130 is shown.

First, the drive mechanism 120 is explained. The drive mechanism 120 comprises:
a linear motor that serves as a drive source having magnet track stators 50b, 50b, and a mover 50a which comprises core and coil;
a cover 52 with an upside-down "U" cross section that protects the linear motor; and
stator-affixing members 51, 51 that affix the stators 50b, 50b.

The stator-affixing members 51, 51 that install and affix the stators 50b, 50b are erected on the base 55 in a manner sandwiching the mover 50a at the center of the base 55.

As shown in FIG. 3, the stators 50b, 50b are installed at equal intervals on the inner walls of the stator-affixing members 51, 51, and the mover 50a is connected between the two stators 50b, 50b in a manner suspended from a connection member 41, where the mover 50a has a cover 52 with an upside-down "U" cross-section affixed on top and this cover 52 is installed in a manner covering the mover 50a, stators 50b, 50b and stator-affixing members 51, 51.

Next, the heat-sealing mechanism 110 is explained. The heat-sealing mechanism 110 comprises:
a pressure heat-sealing part 34 that pressures and heat seals a lid unit component 2 placed on a bag-forming film 30 which moves in the direction of the arrow as it is reeled in; and
a frame body 37 having a top plate 37-1, bottom plate 37-2 and support 37-3 to support this pressure heat-sealing part 34.

The top plate 37-1 and bottom plate 37-2 of this frame body 37 are rectangular, while the support 37-3 is a long quadratic prism which is affixed vertically to the four corners of the top plate 37-1 and bottom plate 37-2. The top surface of the top plate 37-1 has the pair of rectangular members 37' which are structured in such a way that the rear heat-sealing mechanism 110 of the heat-sealing mechanism 110 shown in FIG. 2 can move forward and backward.

The pressure heat-sealing part 34 comprises:
a pressure part 32; and
a heat-sealing part 33.

First, the pressure part 32 is explained. This pressure part 32 comprises:
- a sheet-shaped pressure member 32a installed on the cylinder rod of the hydraulic actuator for pressing 35 which is affixed to the top plate 37-1 of the frame body 37; and
- a pressure plate 32b affixed to the convex part at the center of this member; wherein
the two ends are affixed to the outer cylinder 62 on top in a manner slidable against the support 60.

The heat-sealing part 33 comprises:
- a heat-sealing member 33a; and
- a heat-sealing plate 33b; wherein
the heat-sealing plate 33b is affixed, as illustrated, to the convex part at the center of the heat-sealing member 33a.

A hydraulic actuator for heat-sealing 36 is suspended in such a way that its cylinder rod is running through the center of the actuator suspension member 63, and installed to this cylinder rod in a slidable manner against the actuator suspension member 63. 33a is the sheet-shaped heat-sealing member 33a with a short bar attached on both ends. The actuator suspension member 63 is installed midway in the depth direction of the frame body 37 near the four supports 37-3, where the left and right columnar supports 60 are installed vertically between the top plate 37-1 and bottom plate 37-2 and affixed via the outer cylinder 61 below the support 60.

As explained above, the heat-sealing mechanism 110 comprises:
- a pressure part 32 that in turn comprises a pressure part 32 having a pressure member 32a and pressure plate 32b, and a hydraulic actuator for pressing 35 that moves this pressure part 32 up and down;
- a heat-sealing part 33 that in turn comprises a heat-sealing part 33 having a heat-sealing member 33a and heat-sealing plate 33b, and a hydraulic actuator for heat-sealing 36 that moves this heat-sealing part 33 up and down; and
- a frame body 37 that in turn comprises a top plate 37-1, bottom plate 37-2, and four supports affixed vertically to the four corners of the top plate 37-1 and bottom plate 37-2.

Operation of the heat-sealing mechanism 110 having the structure explained above is described below.

When the lid unit component 2 on the bag-forming film 30 moving in the direction toward the rear in FIG. 2 reaches the position where the heat-sealing plate 33b and heat-sealing plate 32b of the double heat-sealing mechanisms 110, 110 are set, the hydraulic actuator for pressing 35 that moves the pressure plate 32b downward actuates, along with the hydraulic actuator for heat-sealing 36 that moves the heat-sealing plate 33b upward, and accordingly the bag-forming film 30 and lid unit component 2 are pressed between the heat-sealing plate 33b and pressure plate 32b and heated in this condition, as a result of which the two are joined into one piece and then the pressure plate 32b moves upward while the heat-sealing plate 33b moves downward.

Finally, the link mechanism 130 that links the heat-sealing mechanism 110 and drive mechanism 120 is explained by referring to FIGS. 2 and 3.

The link mechanism 130 comprises:
- bases 39, 39 used to install the rail slide members 40, 40 to the bottom plate 37-2;
- a rail slide member 40 having a rail groove;
- rails 53, 53 that are engaged with this rail groove in a slidable manner;
- rail bases 54, 54 on which this rail is placed;
- a connection member 41 that connects the front heat-sealing mechanism 110 to the mover 50a of the linear motor 50;
- a mounting member 42 having a handle mounting member 42-1 for mounting the handle 38-1 of a ball screw 38 and a nut mounting member 42-2 for mounting the nut 38-2" of the ball screw 38; and
- a ball screw 38.

The link mechanism 130 links the heat-sealing mechanism 110 to the drive mechanism 120, while also supporting the heat-sealing mechanism 110 via the rails 53, 53 in a slidable manner. The rails 53, 53 are installed at a position approx. one quarter along the lateral width of the bottom plate 37-2. The handle mounting member 42-1 and nut mounting member 42-2 are installed in a manner suspended from the bottom plate 37-2 of the frame body 37, as shown in FIG. 3.

The upper end of the connection member 41 is affixed at the center of the bottom plate 37-2 of the front row, while the upper end of the mover 50a is connected to the bottom end of the connection member 41 via the cover 52 with an upside-down "U" cross-section which is covering the linear motor 50.

The rail slide member 40 has, at the center in its lower section, a rail groove of a shape that fits the rail 53, and this rail groove is structured in such a way that the double heat-sealing mechanisms 110, 110 do not derail as they slide over the rails 53, 53 according to the driving of the linear motor 50.

As explained above, the connection member 41 of the link mechanism 130 connects the heat-sealing mechanism 110 to the drive mechanism 120, and the rails 53, 53 of the link mechanism 130 and rail slide members 40, 40 slide against the heat-sealing mechanism 110 while also supporting the heat-sealing mechanism 110 so that it can move back and forth according to the driving of the linear motor 50 of the drive mechanism 120, and that derailing can be prevented.

FIG. 3 is a longitudinal section view showing a section of the device shown in FIG. 1 cut along the II-II line, where a longitudinal section of the double heat-sealing mechanisms 110, 110 comprising two units of the heat-sealing mechanism 110 installed side by side in parallel, as well as of the drive mechanism 120 and link mechanism 130, is shown.

As indicated in the explanation of FIG. 2, the pressure part 32 comprises:
- a sheet-shaped pressure member 32a installed on the cylinder rod of the hydraulic actuator for pressing 35 which is affixed to the top plate 37-1 of the frame body 37; and
- a pressure plate 32b affixed to the convex part at the center of this member.

The heat-sealing part 33 comprises:
- a heat-sealing member 33a installed to the cylinder rod of the hydraulic actuator for heat sealing 36; and
- a heat-sealing plate 33b affixed to the convex part at the center of this member.

Provided below the bottom plate 37-2 of the frame body 37 is an interval adjustment member 38 that moves the left heat-sealing mechanism 110 to the left and right with respect to the right heat-sealing mechanism 110 in order to adjust the interval between the two mechanisms.

This interval adjustment member 38 comprises:
- an operation handle 38-1 which is operated when adjusting the interval; and
- a ball screw 38-2.

Here, the ball screw 38-2 comprises:
a screw shaft 38-2'; and
a nut 38-2".

The two mechanisms are installed with their interval adjusted to a range of 50 to 100 mm, and this interval is adjustable according to the type and size of the sheet package.

The interval adjustment member 38 is installed between the left heat-sealing mechanism 110 which is used as a reference for adjustment, and the right heat-sealing mechanism 110 which is actually adjusted. To be specific, as illustrated the operation handle 38-1 is installed on the handle mounting member 42-1 provided at the bottom of the rear heat-sealing mechanism 110, and the screw shaft 38-2' of the ball screw 38-2 is inserted into the through hole provided in this handle mounting member 42-1, while the nut 38-2" is affixed to the nut mounting member 42-2 provided in the bottom left-hand side of the front heat-sealing mechanism 110.

When the operation handle 38-1 is rotated, the screw shaft 38-2' turns and the rail slide member 40 of the rear heat-sealing mechanism 110 to be adjusted, which is being held in a sandwiched manner on the rails 53, 53, moves to the left and right on the rails 53, 53, as a result of which the rear heat-sealing mechanism 110 moves and consequently the interval between the two heat-sealing mechanisms 110 can be adjusted. When the rail slide member 40 of the rear heat-sealing mechanism 110 moves, the top plate 37-1 of the rear heat-sealing mechanism 110 slides against a pair of rectangular members 37' according to the movement of the rail slide member 40.

Symbol 44 indicates a bellows cover used to protect the linear motor 50 as well as its stator-affixing members 51, 51, where both ends of the cover 52 having an upside-down "U" cross section are affixed to the ends of the bellows covers 44, 44.

FIG. 3 is referenced to explain the mutual relational motions that take place when the pressure heat-sealing part 34 of the heat-sealing device 110 moves up and down, while the linear motor 50 of the drive mechanism 120 moves back and forth, in order to pressure the lid unit onto the moving bag-forming film 30 and thereby heat seal the two.

The linear motor 50, which is a drive source that drives the double heat-sealing mechanisms 110, 110, comprises:
a mover 50a which comprises a core and a coil; and
magnet track stators 50b, 50b,
as explained above.

When a specified amount of electrical current is supplied to the coil of the mover 50a, the mover 50a moves forward and backward and this motive power is transmitted to the front heat-sealing mechanism 110 via the connection member 41, and consequently the double heat-sealing mechanisms 110, 110 move forward and backward.

By the way, the bag-forming film 30 is moving at a constant speed in the moving direction shown by the arrow, and therefore the double heat-sealing mechanisms 110, 110 must also move in the moving direction at the same speed as the bag-forming film 30 in order to press the lid unit component onto the bag-forming film and thermally seal the two. For this reason, the double heat-sealing mechanisms 110, 110 move in a condition where the pressure heat-sealing parts 34, 34 are moving up and down at appropriate positions to keep the bag-forming film 30 and lid unit component 2 pressed against each other, and heat seals the two. Once the two have been joined, the pressure heat-sealing parts 34, 34 are returned to their original positions at a speed higher than the speed at the same time when the bag-forming film 30 and lid unit component 2 are released, and these same operations as mentioned above are repeated continuously. To repeat these operations continuously, specific controls are implemented so that a specified amount of electrical current is supplied to the coil of the mover 50a.

FIG. 4 is a plan view showing the pressure member 32a and pressure plate 32b of the pressure part 32 as seen from below.

The pressure member 32a is a flat member whose width is the largest at the center and decreases gradually toward both ends and a convex shape is formed in the position where the pressure plate 32b is to be installed, where the flat pressure plate 32b will be affixed to this convex part.

FIG. 5 is a plan view showing the heat-sealing member 33a and heat-sealing plate 33b of the heat-sealing part 33 as seen from above. The heat-sealing part 33 comprises a heat-sealing member 33a and heat-sealing plate 33b, and as illustrated it is installed with bolts and nuts on the convex part at the center of the heat-sealing member 33a so that the heat-sealing plate 33b can be replaced. The shape of the heat-sealing plate 33b is the same as the shape of the lid unit component 2.

If the type or size of sheet packages handled on the production line is changed, the heat-sealing mechanism must be moved for interval adjustment as described above to meet the new type or size, while the shape of the heat-sealing plate 33b must also be replaced to one matching the shape of the lid unit component 2 of the new sheet package to be produced.

When a heat-sealing device for packages conforming to the present invention was used to measure how many lid unit components 2 placed on a bag-forming film could be joined with the film into one piece, 50 units could be joined per minute. Since conventional devices can join approx. 20 units per minute, the production efficiency has practically increased by 2.5 times.

It has been shown that the heat-sealing device for packages can double the production efficiency due to its double heat-sealing mechanisms 110, 110 and also increase the production efficiency by another 50 percent due to its drive source comprising a linear motor 50 instead of a rotary motor, thereby resulting in a production efficiency improvement totaling 2.5 times. Also note that use of a linear motor 50 as a drive source prevents the accuracy from dropping even after a long period of continuous operation.

To control the heat-sealing mechanism 110 and drive mechanism 120, various controls are required. For the heat-sealing mechanism 110, for example, the required controls include one that actuates the hydraulic actuator for pressing and hydraulic actuator for heat-sealing when the lid unit component 2 reaches an appropriate position, and one that heats the heat-sealing plate 33b for an appropriate duration of time. For the drive mechanism 120, on the other hand, the required controls include one that sequentially controls power-on, power-off, forward/reverse direction switching and other operations relating to the linear motor 50. However, those skilled in the art of the technical field covering these heat-sealing devices should be able to implement the various types of sequence controls mentioned above, so long as they understand the structure of the heat-sealing device for packages as described above. Accordingly, the control devices required for controlling the heat-sealing mechanism 110 and drive mechanism 120 are not explained herein.

Additionally, while double heat-sealing mechanisms were explained in the mode of embodiment, the present invention is not at all limited to double heat-sealing mechanisms and triple heat-sealing mechanisms, equipped with the third heat-sealing mechanism between the front heat-sealing mechanism and rear heat-sealing mechanism, can also be used with the aim of improving the productivity further.

In the present disclosure, "the present invention" refers to at least one of the disclosure embodiments or at least one embodiment of the invention. In the present disclosure where conditions and/or structures are not specified, the skilled artisan in the art can readily provide such conditions and/or structures, in view of the present disclosure, as a matter of routine experimentation.

This application claims the priority to Japanese Patent Application No. 2008-274037, filed Oct. 24, 2008, and the disclosure of which is herein incorporated by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A heat-sealing device for sheet packages that presses and heat seals a lid unit component onto a bag-forming film, wherein said heat-sealing device for sheet packages is characterized in that it is equipped with:
   a pressure heat-sealing part that presses and heat seals a lid unit component placed on a moving bag-forming film;
   a heat-sealing mechanism having a frame body to support the pressure heat-sealing part;
   a drive mechanism having a linear motor that serves as a drive source to move the heat-sealing mechanism back and forth; and
   a link mechanism that links the said two mechanisms;
   wherein the heat-sealing mechanism comprises double heat-sealing mechanisms having two units of the heat-sealing mechanism installed side by side in parallel at positions vertical to the moving direction of the bag-forming film;
   wherein the linear motor of the drive mechanism comprises multiple pairs of stators and a mover provided between each pair; and
   wherein the link mechanism comprises:
   the frame body of the front heat-sealing mechanism as viewed in the moving direction of the bag-forming film;
   a connection member that connects the mover of the drive mechanism;
   a rail that supports the double heat-sealing mechanisms in a slidable manner; and
   a rail slide member.

2. A heat-sealing device for sheet packages according to claim 1, characterized in that the pressure heat-sealing part comprises:
   a pressure part that presses the lid unit component; and
   a heat-sealing part that heats the bag-forming film and makes it as one piece with the lid unit component;
   while the frame body comprises:
   a top plate;
   a bottom plate; and
   a support.

3. A heat-sealing device for sheet packages according to claim 2, characterized in that the pressure part is installed on the cylinder rod of a hydraulic actuator for pressing while the heat-sealing part is installed on the cylinder rod of a hydraulic actuator for heat sealing, and the top plate and bottom plate are rectangular.

4. A heat-sealing device for sheet packages according to claim 3, characterized in that the heat-sealing part comprises:
   a heat-sealing member; and
   a heat-sealing plate.

5. A heat-sealing device for sheet packages according to claim 4, characterized in that the heat-sealing plate of the heat-sealing part is replaceable.

6. A heat-sealing device for sheet packages according to claim 1, characterized in that the connection member is affixed at the center of the bottom plate constituting the frame body of the front heat-sealing mechanism, where the mover is connected to the bottom end of the connection member.

7. A heat-sealing device for sheet packages according to claim 6, characterized in that the rail is installed on rail bases provided at the left end and right end of the base of said heat-sealing device for sheet packages, where the rail slide member has a rail groove that engages with the rail.

8. A heat-sealing device for sheet packages according to claim 7, characterized in that an interval adjustment member that adjusts the interval between the double heat-sealing mechanisms, is installed on a mounting member mounted at the center of the left end of the bottom plate constituting the frame body of the front heat-sealing mechanism and also on a mounting member mounted at the center of the bottom plate constituting the frame body of the rear heat-sealing mechanism.

9. A heat-sealing device for sheet packages according to claim 8, characterized in that the interval adjustment member comprises a ball screw with operation handle.

10. A heat-sealing device for sheet packages according to claim 9, characterized in that the operation handle of the ball screw with operation handle is installed on a mounting member mounted at the center of the rear row's bottom plate, while the screw of the ball screw with operation handle is installed on a mounting member mounted at the center of the left end of the front row's bottom plate.

11. A heat-sealing device for sheet packages according to claim 10, characterized in that the mounting members of the rear row and front row are installed in a manner suspended respectively from the bottom plates.

12. A heat-sealing device for sheet packages according to claim 11, characterized in that the interval between the double heat-sealing mechanisms can be adjusted by operating the operation handle.

13. A heat-sealing device for sheet packages according to claim 11, characterized in that the double heat-sealing mechanisms move back and forth via the connection member that links to the mover of the linear motor, in accordance with the back-and-forth movement of the mover.

14. A heat-sealing device for sheet packages according to claim 13, characterized in that the rail slide member of the link mechanism moves back and forth while sliding on the rail of the link mechanism.

15. A heat-sealing device for sheet packages according to claim 1, characterized in that the stators of the drive mechanism are installed at equal intervals on the inner walls of the stator-affixing members provided at the center of the base of said heat-sealing device for sheet packages, in a manner erected on the base and sandwiching the mover.

16. A heat-sealing device for sheet packages according to claim 15, characterized in that the mover of the drive mechanism is connected between the pair of stators in a manner suspended from the connection member.

17. A heat-sealing device for sheet packages according to claim 16, characterized in that the mover has a cover with an upside-down "U" cross-section affixed on top, and the cover is installed in a manner covering the mover and stator-affixing members.

18. A heat-sealing device for sheet packages according to claim 1, characterized in that the bag-forming film travels on the film transfer panel having a space at the center.

19. A heat-sealing device for sheet packages according to claim 18, characterized in that the film transfer panel is made of knurled stainless steel.

* * * * *